United States Patent
Lee et al.

(10) Patent No.: US 9,645,615 B2
(45) Date of Patent: May 9, 2017

(54) WATERPROOF NOTEBOOK COMPUTER

(71) Applicant: Quanta Computer Inc., Taoyuan (TW)

(72) Inventors: Kun-Ho Lee, New Taipei (TW); I-Hao Chen, New Taipei (TW); Yu-Wen Chen, New Taipei (TW); Hui-Ju Yang, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 74 days.

(21) Appl. No.: 14/934,963

(22) Filed: Nov. 6, 2015

(65) Prior Publication Data
US 2017/0038801 A1    Feb. 9, 2017

(30) Foreign Application Priority Data
Aug. 7, 2015  (TW) .............................. 104125827 A

(51) Int. Cl.
*G06F 1/16* (2006.01)
*G06F 3/041* (2006.01)

(52) U.S. Cl.
CPC ............ *G06F 1/1656* (2013.01); *G06F 1/169* (2013.01); *G06F 1/1616* (2013.01); *G06F 3/041* (2013.01)

(58) Field of Classification Search
None
See application file for complete search history.

(56) References Cited

U.S. PATENT DOCUMENTS

| | | | | |
|---|---|---|---|---|
| 4,791,258 A | * | 12/1988 | Youtz | H01H 13/70 174/564 |
| 8,294,843 B2 | * | 10/2012 | Hollaway | G02F 1/133308 345/173 |
| 8,344,277 B1 | * | 1/2013 | Bloch | H01H 13/06 200/302.2 |
| 8,823,639 B2 | * | 9/2014 | Jackson | G06F 3/011 345/156 |
| 8,884,908 B2 | * | 11/2014 | Okumura | G06F 3/041 345/173 |
| 9,069,201 B2 | * | 6/2015 | Pipitone | G02F 1/133308 |
| 2005/0057526 A1 | * | 3/2005 | Kinoshita | G06F 1/1607 345/173 |
| 2006/0256079 A1 | * | 11/2006 | Wu | G06F 1/169 345/156 |
| 2006/0267962 A1 | * | 11/2006 | Baier | F24C 7/082 345/173 |

(Continued)

FOREIGN PATENT DOCUMENTS

| | | |
|---|---|---|
| TW | M355421 U | 4/2009 |
| TW | M503070 U | 6/2015 |

*Primary Examiner* — Xanthia C Cunningham
(74) *Attorney, Agent, or Firm* — Rabin & Berdo, P.C.

(57) ABSTRACT

A waterproof notebook computer includes a chassis, a flexible waterproof pad, a touchpad and a trigger switch. The chassis has a receiving space. The flexible waterproof pad is exposed from one surface of the chassis, and all edges of the flexible waterproof pad are connected to the chassis hermetically so that the receiving space of the chassis is isolated from the exterior of the chassis. The trigger switch is disposed inside the receiving space. The touchpad is disposed between the trigger switch and the flexible waterproof pad. When the touchpad is pressed towards the receiving space through the flexible waterproof pad, the flexible waterproof pad stretches to move the touchpad to trigger the trigger switch.

10 Claims, 8 Drawing Sheets

(56) References Cited

U.S. PATENT DOCUMENTS

| | | | |
|---|---|---|---|
| 2006/0279550 A1* | 12/2006 | Lii | G06F 1/1616 345/173 |
| 2007/0139388 A1* | 6/2007 | Lee | G06F 1/1616 345/173 |
| 2011/0128114 A1* | 6/2011 | Kimura | G06F 3/045 338/13 |
| 2011/0304961 A1* | 12/2011 | Lin | G06F 1/169 361/679.01 |
| 2012/0162143 A1* | 6/2012 | Kai | G06F 1/1626 345/177 |
| 2012/0256867 A1* | 10/2012 | Annacone | G06F 3/044 345/174 |
| 2013/0027861 A1* | 1/2013 | Rosenau | G02F 1/133308 361/679.01 |
| 2013/0335211 A1* | 12/2013 | Kobayashi | G06F 1/1626 340/407.2 |
| 2015/0055034 A1* | 2/2015 | Pipitone | G02F 1/133308 349/12 |
| 2015/0293619 A1* | 10/2015 | Li | G06F 3/041 345/173 |
| 2016/0124531 A1* | 5/2016 | Marwah | G06F 1/1643 345/173 |
| 2017/0013101 A1* | 1/2017 | Chen | H04M 1/185 |

* cited by examiner

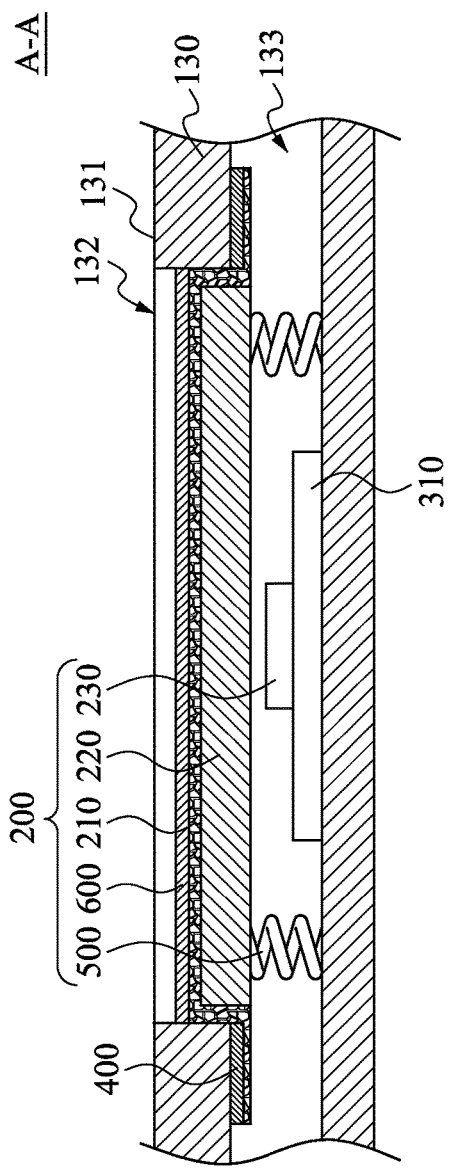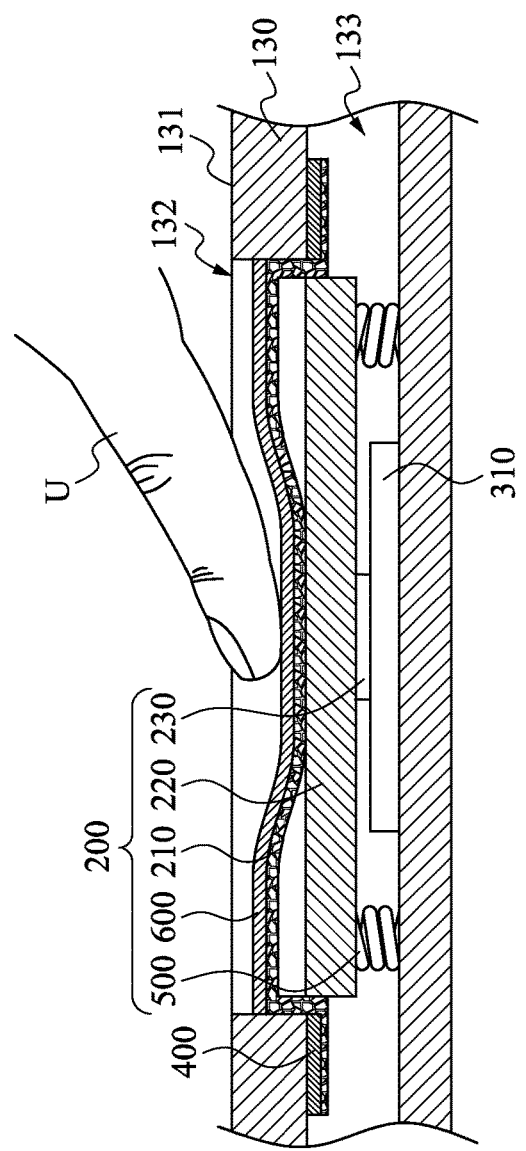

WATERPROOF NOTEBOOK COMPUTER

RELATED APPLICATIONS

This application claims priority to Taiwan Application Serial Number 104125827, filed Aug. 7, 2015, which is herein incorporated by reference.

BACKGROUND

Field of Disclosure

The disclosure relates to a waterproof notebook computer. More particularly, the disclosure relates to a notebook computer having a waterproof touchpad.

Description of Related Art

Generally, a notebook computer is provided with a touchpad adjacent to a keyboard for controlling a cursor shown on a display of the notebook computer. The touchpad also includes press keys below the touchpad configured to select an objective or execute a particular function. A user may easily move the cursor and select an object by the touchpad. Typically, a method for assembling a touchpad onto a notebook computer, an opening is formed on a chassis of the notebook computer in assembling a touchpad of a notebook computer. The touchpad is then installed inside the chassis and a touch control surface of the touchpad is exposed from the opening. Moreover, while the touchpad is pressed down, the touchpad itself can be physically descended that resembles mechanically pressing experiences so as to a more humanization service.

However, as the notebook computer encounters water splash, the water or dusts may infiltrate into the chassis through a gap of the opening between the touch control surface and the chassis. As such, damage or corrosion occurs to interior components of the notebook computer.

Therefore, it is desperate to provide a solution to effectively solve the aforementioned inconvenience and shortages and to be more competitive in the industry.

SUMMARY

One aspect of the disclosure is to provide a waterproof notebook computer to overcome the defects and inconvenience of the prior art.

According to one embodiment, the waterproof notebook computer includes a chassis, a flexible waterproof pad, a touchpad and a trigger switch. The chassis has a receiving space. The flexible waterproof pad is exposed from one surface of the chassis, and all edges of the flexible waterproof pad are connected to the chassis hermetically so that the receiving space of the chassis is isolated from the exterior of the chassis. The trigger switch is disposed inside the receiving space. The touchpad is disposed between the trigger switch and the flexible waterproof pad. When the touchpad is pressed towards the receiving space through the flexible waterproof pad, the flexible waterproof pad stretches to move the touchpad to trigger the trigger switch.

Thus, since the flexible waterproof pad is stretchable with certain extensibility, when the touchpad is pressed down through the flexible waterproof pad, the flexible waterproof pad cannot be removed from the chassis and can isolate the receiving space of the chassis from the exterior of the chassis.

Because the flexible waterproof pad of the aforementioned notebook computer is able to be stretched to trigger the trigger switch, and to isolate the receiving space of the chassis from the exterior of the chassis, the disclosure is able to lessen the possibility of water or dusts directly entering into the notebook computer so as to prevent damage to the notebook computer.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

FIG. 2 is a cross sectional view of the waterproof notebook computer taken along line A-A of FIG. 1;

FIG. 3 is an operational schematic view as the flexible waterproof pad of FIG. 2 being pressed;

DESCRIPTION OF THE EMBODIMENTS

Figure 1:
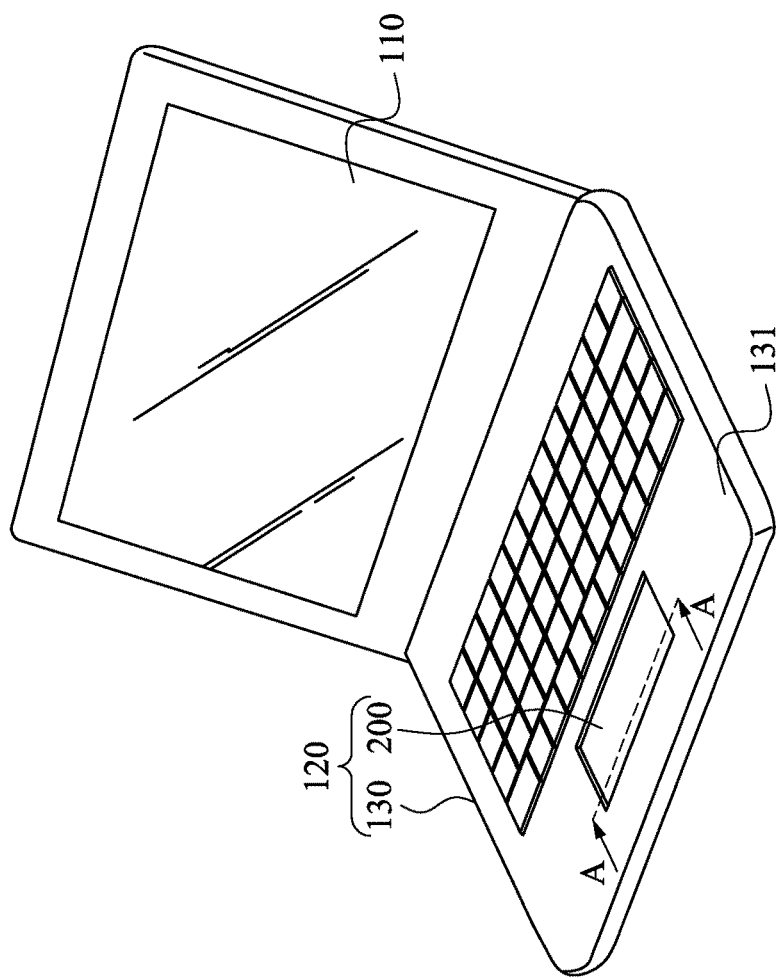
FIG. 1 is a perspective view of a waterproof notebook computer according to a first embodiment of this disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Because the touchpad of the conventional notebook computer can be mechanically pressed, water or dusts may easily enter into the chassis via a slot existing between the touchpad and the chassis so as to cause damage or corrosion to the interior components of the conventional notebook computer. In the disclosure, a flexible waterproof pad covers and seals an opening arranged above a touchpad of a notebook computer. Thus, when the touchpad is pressed down through the flexible waterproof pad, as the flexible waterproof pad is stretchable with certain extensibility, the flexible waterproof pad cannot be removed from the opening, and the flexible waterproof pad can isolate the receiving space of the chassis from the exterior of the chassis, the disclosure is able to lessen the possibility of water or dusts directly entering into the notebook computer so as to prevent damage to the notebook computer.

First Embodiment

Reference is now made to FIG. 1 in which FIG. 1 is a perspective view of a waterproof notebook computer 100 according to a first embodiment of this disclosure. As shown in FIG. 1, the waterproof notebook computer 100 includes a screen 110 and a base 120. The screen 110 is pivotally disposed on the base 120. The base 120 includes a chassis 130 and a touchpad assembly 200. The touchpad assembly 200 is disposed on the chassis 130 for moving a cursor or selecting an objective. Also, the touchpad assembly 200 is provided with a mechanical pressing structure for providing mechanically pressing experiences to a user.

FIG. 2 is a cross sectional view of the waterproof notebook computer taken along line A-A of FIG. 1. As shown in FIG. 2, a top surface 131 of the chassis 130 is formed with an opening 132. The touchpad assembly 200 includes a flexible waterproof pad 210, a touchpad 220 and a trigger switch 230. The chassis 130 is formed with a receiving space 133, and the receiving space 133 is in communication with the opening 132. The flexible waterproof pad 210 is exposed outwards from the top surface 131 of the chassis 130 through the opening 132 so that the flexible waterproof pad 210 is viewable from the top surface 131 of the chassis 130. All edges of the flexible waterproof pad 210 are connected to the chassis 130 hermetically so that the flexible waterproof pad 210 isolates the receiving space 133 from the exterior of the chassis 130 via the opening 132. The touchpad 220 is disposed inside the receiving space 133 in which one surface of the touchpad 220 is flat connected to the flexible waterproof pad 210, so that the touchpad 220 can be moved along with the flexible waterproof pad 210. The trigger switch 230 is mounted on one surface of a circuit board 310 facing towards the touchpad 220. In another specific embodiment, the trigger switch 230 can be alternatively disposed on one surface of the touchpad 220 opposite to the flexible waterproof pad 210.

As shown in FIG. 3, when a user U presses the touchpad 220 towards the receiving space 133 by directly pressing the flexible waterproof pad 210 to a pressing stroke, since the flexible waterproof pad 210 is stretchable with certain extensibility, the pressing stroke that the flexible waterproof pad 210 is temporarily stretched and deformed is long enough for moving the touchpad 220 down to press the trigger switch 230. The trigger switch 230 is therefore triggered to send signals to the notebook computer via the circuit board 310 for operating the notebook computer correspondingly.

In one specified embodiment, the circuit board 310 can be a part of integrated circuits (e.g., main board) of the notebook computer 100 or the touch pad assembly 200. If the circuit board 310 is a part of the integrated circuits of the touchpad assembly 200, the base 120 is provided with corresponding integrated circuits for transmitting the signals to the notebook computer 100. Moreover, in another embodiment, the circuit board 310 also can be integrally formed with the touchpad 220 together (see third embodiment will be described below).

In greater details, all edges of the flexible waterproof pad 210 are bonded to the inner wall of the chassis 130 so that the flexible waterproof pad 210 can cover the opening 132 hermetically, and exposes a part of the flexible waterproof pad 210 outwards from the opening 132. For example, all edges of the flexible waterproof pad 210 are bonded to the inner wall of the chassis 130 by an adhesive layer 400 (e.g., waterproof adhesive glue or hot melt glue) for isolating the receiving space 133 from the exterior of the chassis 130 via the opening 132. However, the disclosure is not limited thereto, in another embodiment, all edges of the flexible waterproof pad 210 can be bonded to the inner wall of the chassis 130 by other well-known techniques or isolating the receiving space 133 from the exterior of the chassis 130 via the opening 132.

In one option of the embodiment, the touchpad assembly 200 includes a plurality of springs 500. The trigger switch 230 is arranged between the springs 500, and each of the springs 500 is connected between the touchpad 220 and the chassis 130 for pushing the touchpad 220 back to the original position. When the user U stops pressing the touchpad 220 through the flexible waterproof pad 210, the springs 500 can push the touchpad 220 and the flexible waterproof pad 210 back to the original position.

In another option of the embodiment, the flexible waterproof pad 210 includes a protective film 600 (e.g., Mylar). The protective film 600 covers on one surface of the flexible waterproof pad 210 opposite to the receiving space 133. Not only does the protective film 600 protects the flexible waterproof pad 210, but also provides the same color or pattern with the top surface 131 of the chassis 130.

Second Embodiment

Figure 4:
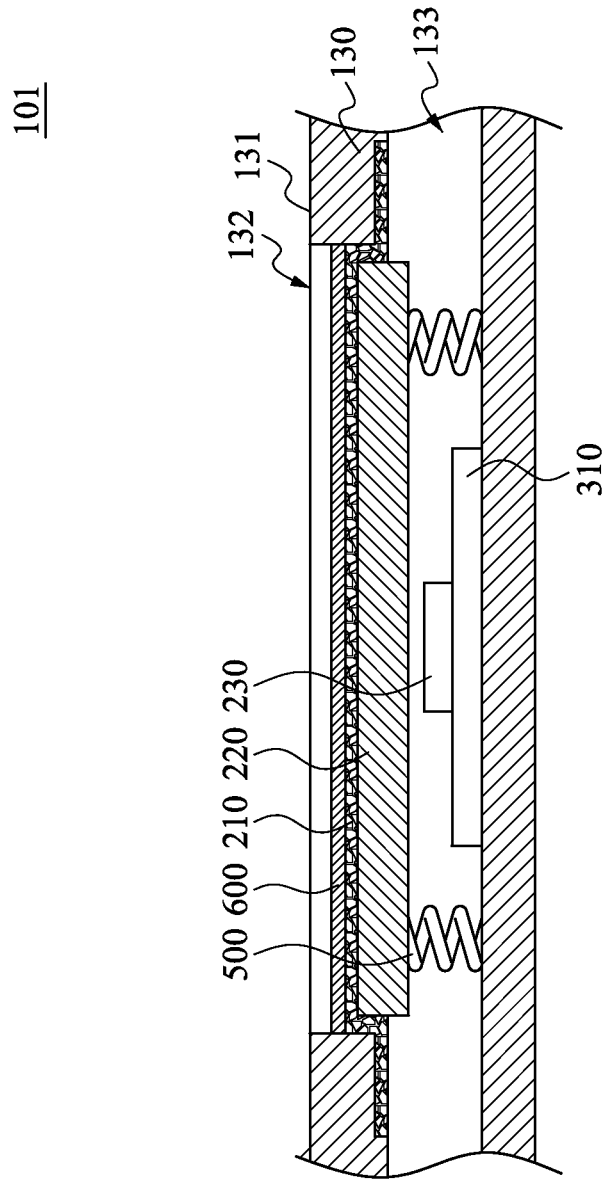
FIG. 4 is a cross sectional view of a waterproof notebook computer according to a second embodiment of this disclosure in which the sectional region in FIG. 4 to the waterproof notebook computer is the same as the sectional region in FIG. 2 to the waterproof notebook computer.

FIG. 4 is a cross sectional view of a waterproof notebook computer according to a second embodiment of this disclosure in which the sectional region in FIG. 4 to the waterproof notebook computer is the same as the sectional region in FIG. 2 to the waterproof notebook computer. The notebook computer 101 of the second embodiment is substantially the same as the notebook computer 100 of the first embodiment, expect that the flexible waterproof pad 210 of the first embodiment is removably assembly on the chassis 130 of the notebook computer 100, however, as shown in FIG. 4, in this embodiment, all of the edges of the flexible waterproof pad 210 are seamlessly connected to the chassis 130 without the aforementioned adhesive layer, so that the flexible waterproof pad 210 isolates the receiving space 133 from the exterior of the chassis 130.

In one option of the embodiment, the flexible waterproof pad 210 and the chassis 130 are integrally formed together by injection-molding method, for example, a double-injection-molding process so as to decrease that water or dust directly enters into the notebook computer 101. Thus, since the flexible waterproof pad 210 can be integrally formed together with the chassis 130, thus, the steps of forming the chassis and then forming the opening on the chassis can be saved so as to simplify manufacturing process and decrease manufacturing cost.

Also, since the structural strengths for the flexible waterproof pad 210 and the chassis 130 are different, material selected for the flexible waterproof pad 210 and the chassis 130 also are different, and the hardness of the flexible waterproof pad 210 and the chassis 130 are different accordingly. For example, when the hardness of the flexible waterproof pad 210 is lower than the hardness of the chassis 130, not only the flexible waterproof pad 210 can be softer, but also the flexibility of the flexible waterproof pad 210 can be adjusted. The chassis 130 for example, is made of plastic, and the flexible waterproof pad 210 for example, is made of rubber. However, the disclosure is not limited thereto, in another embodiment, by a triple-injection-molding process, all of the edges of the flexible waterproof pad made by composites materials are integrally formed with the chassis hermetically, alternatively, by other well known methods (e.g., thermal fusion bonding method), all of the edges of the flexible waterproof pad still can be seamlessly connected to the chassis, so as to isolate the receiving space from the exterior of the chassis.

Third Embodiment

Figure 5:
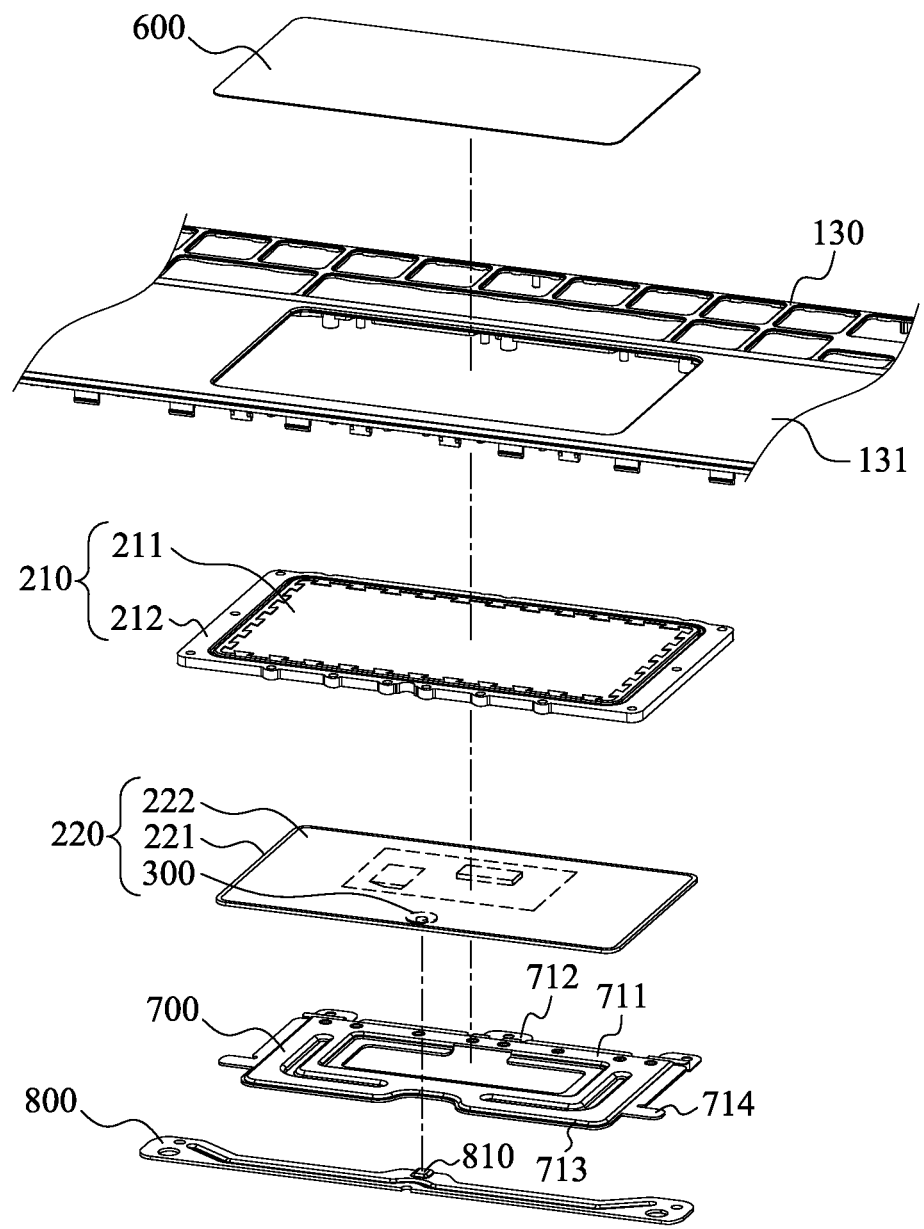
FIG. 5 is a disassembled view of a touchpad module and a partial area of a chassis of a waterproof notebook computer according to a third embodiment of this disclosure.
Figure 6:
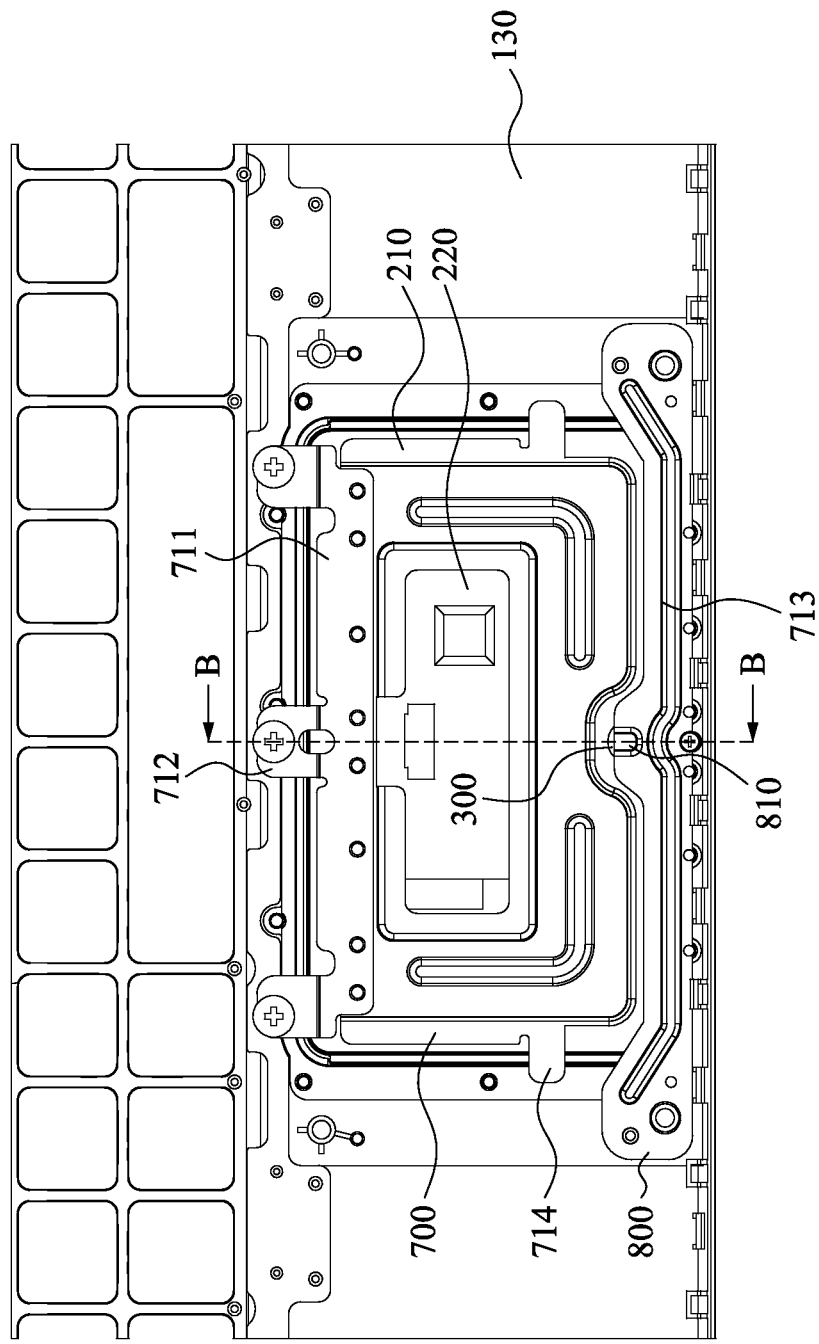
FIG. 6 is a bottom view when assembling the touchpad module and the chassis of FIG. 5.

Reference is now made to FIG. 5 and FIG. 6 in which FIG. 5 is a disassembled view of a touchpad module 200 and a partial area of a chassis 130 of a waterproof notebook computer 102 according to a third embodiment of this disclosure, and FIG. 6 is a bottom view when assembling the touchpad module 200 and the chassis 130 of FIG. 5. As shown in FIG. 5 and FIG. 6, the notebook computer 102 of the third embodiment is substantially the same as the notebook computer 100 of the first embodiment, however, besides the flexible waterproof pad 210, the touchpad 220 and the trigger switch 300, the third embodiment also includes an elastic frame 700 and a fixed frame 800. The elastic frame 700 is pressably disposed inside the receiving space 133 and is used to load the touchpad 220 so that the touchpad 220 is disposed between the flexible waterproof pad 210 and the elastic frame 700. For example, the touchpad 220 is bonded to the elastic frame 700 by an adhesive layer 401 (e.g., waterproof adhesive glue or hot melt glue, refer to FIG. 7). However, the disclosure is not limited thereto, in another embodiment, the touchpad also can be bonded to the elastic frame by other well known methods.

The elastic frame 700 includes a connection end 711 and a free end 713 which are opposite with each other. The connection end 711 of the elastic frame 700 is connected to the chassis 130, for example, fixedly screwed on the inner wall of the chassis 700 being adjacent to one side of the opening 132 so that one side of the flexible waterproof pad 210 is sandwiched between the elastic frame 700 and the inner wall of the chassis 130. The fixing frame 800 is fixed inside the receiving space 133, for example, fixedly screwed on the inner wall of the chassis 130 being adjacent to the other side of the opening 132 so that the other side of the flexible waterproof pad 210 is sandwiched between the fixing frame 800 and the inner wall of the chassis 130.

Since the side of the flexible waterproof pad 210 is sandwiched between the elastic frame 700 and the inner wall of the chassis 130, and the other side of the flexible waterproof pad 210 is sandwiched between the fixing frame 800 and the inner wall of the chassis 130, thus, the flexible waterproof pad 210 is limited to the opening 132 and will not be overstretched when pressed towards the receiving space 133.

Figure 7:
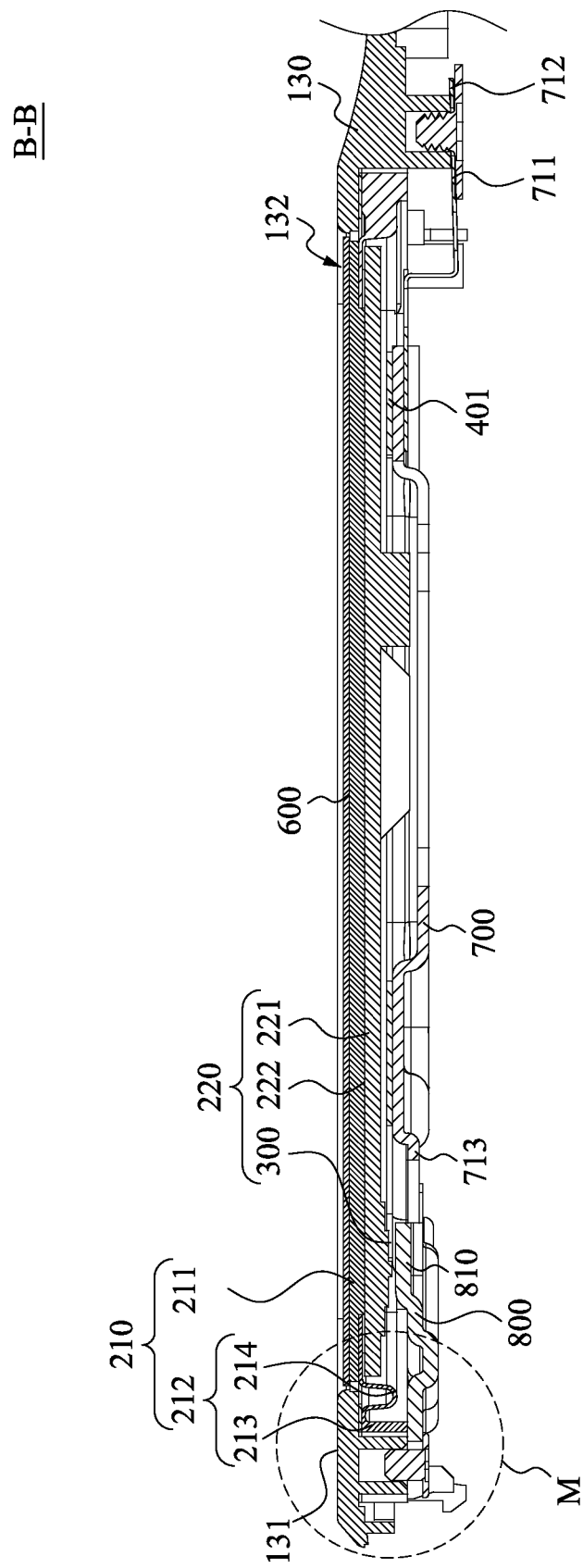
FIG. 7 is a cross sectional view of the waterproof notebook computer taken along line B-B of FIG. 6.
Figure 8:
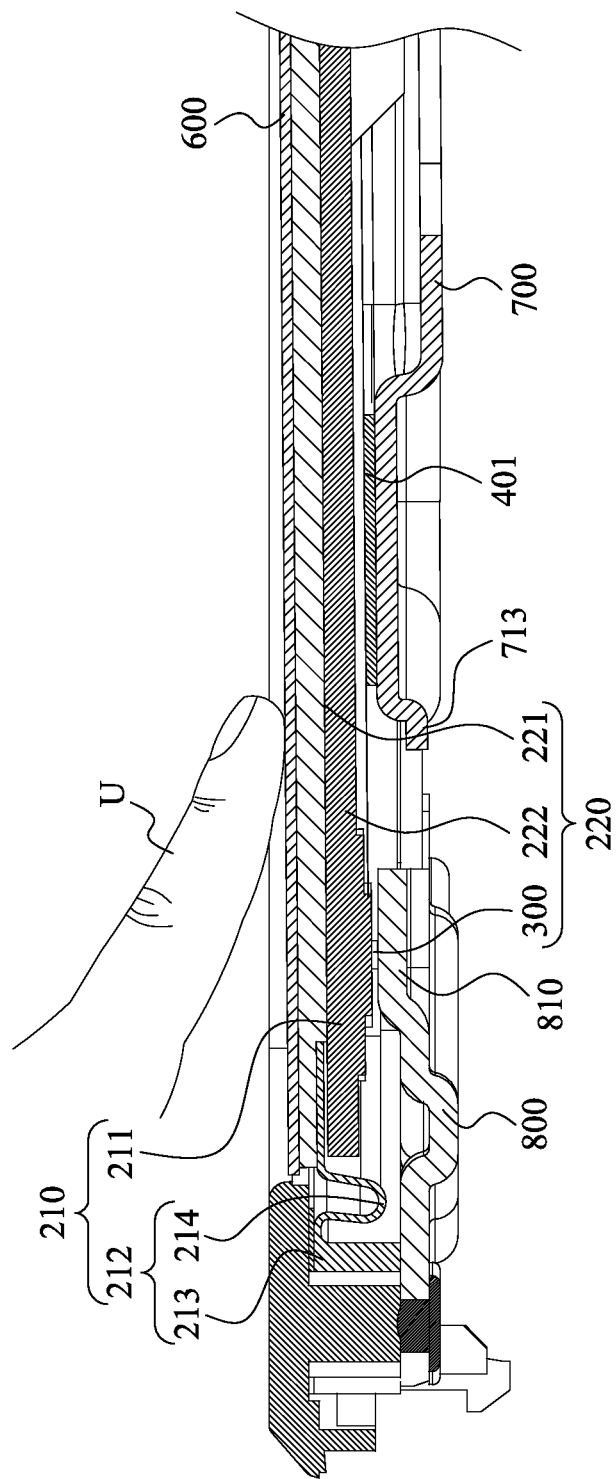
FIG. 8 is an operational schematic view as the flexible waterproof pad of FIG. 7 being pressed.

Reference is now made to FIG. 7 and FIG. 8 in which FIG. 7 is a cross sectional view of the waterproof notebook computer taken along line B-B of FIG. 6, and FIG. 8 is an operational schematic view as the flexible waterproof pad of FIG. 7 being pressed. As shown in FIG. 5 and FIG. 7, the touchpad 220 includes a circuit substrate 221 and a touch control surface 222. The touch control surface 222 is disposed on one surface of the circuit substrate 221, and is in contact with the flexible waterproof pad 210. Other than the trigger switch 300 of the first embodiment, the trigger switch 300 is physically disposed on the touchpad 220, more particularly, the trigger switch 300 is mounted on one side of the circuit substrate 221 opposite to the flexible waterproof pad 210, and is exposed at the free end 713 of the elastic frame 700 so as to be unveiled at the free end 713 of the elastic frame 700. The trigger switch 300 is not limited to electrically connect the touchpad 220. Preferably, the fixing frame 800 is provided with a bump 810. The bump 810 is aligns with the trigger switch 300 unveiled at the free end 713 of the elastic frame 700, that is, an orthogonal projection of the trigger switch 300 is overlapped with of the bump 810. Furthermore, the connection end 711 of the elastic frame 700 is formed with elastic sheets 712 separately arranged thereof. After the elastic sheets 712 are pressed, the elastic sheets 712 lead the elastic frame 700 to return back to its original position.

Thus, as shown in FIG. 8, when the user U presses down the touchpad 220 through the flexible waterproof pad 210, the touchpad 220 is pressed to bend the elastic frame 700 by pressing against the free end 713 of the elastic frame 700 downwardly. Hence, the trigger switch 300 of the touchpad 220 is moved to press against the bump 810 so as to trigger the trigger switch 300 by the bump 810.

Furthermore, two ribs 714 are respectively extended outwards from two opposite sides of the elastic frame 700. The ribs 714 respectively abut the flexible waterproof pad 210 so that the elastic frame 700 will not continually move towards the opening 132 from the receiving space 133 for protecting the elastic frame 700 and the flexible waterproof pad 210 when the elastic frame 700 is returned back to its original position.

Figure 9:
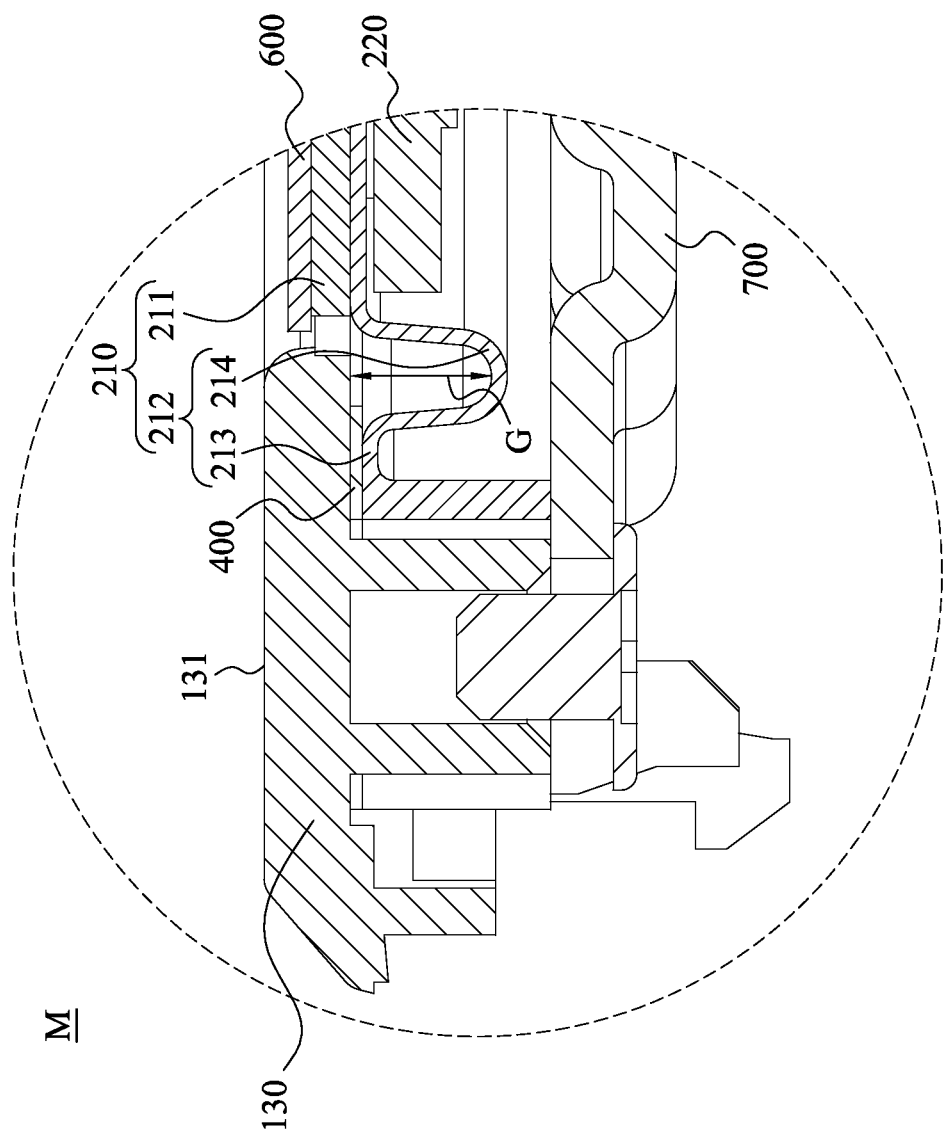
FIG. 9 is an enlarged view of a zone M of FIG. 7.

FIG. 9 is an enlarged view of a zone M of FIG. 7. As shown in FIG. 5 and FIG. 9, the flexible waterproof pad 210 includes a plane portion 211 and an enclosing portion 212. The enclosing portion 212 surrounds the plane portion 211, and the enclosing portion 212 is connected to the plane portion 211 and the chassis 130 hermetically. In other embodiments, the fashions of the enclosing portion 212 hermetically connected to the plane portion 211 and the chassis 130 may not be limited to the adhesive layer or the mold injection process described above only in the present disclosure. The plane portion 211 and the enclosing portion 212 can be coupled together with serrated or dovetail-shaped coupling structure arranged thereof so as to hence the coupling strength of the plane portion 211 and the enclosing portion 212. However, the disclosure is not limited to such coupling structures.

The plane portion 211 and the enclosing portion 212 can be formed by a single-material injection molding process, a double-injection-molding process or an insert injection-molding molding process. Thus, the material of the plane portion 211 and the enclosing portion 212 can be different or the same. The material of the plane portion 211 and the enclosing portion 212 can be selected from a group consisted of metal, plastic or rubber. However, the disclosure is not limited thereto. The hardness of the plane portion 211 is different to the hardness of the enclosing portion 212. Since the required coupling strengths of the plane portion 211 and the enclosing portion 212 are different, the material of the plane portion 211 and the enclosing portion 212 certainly can be different so that the hardness of the plane portion 211 and the hardness of the enclosing portion 212 are different accordingly. For instance, when the hardness of the plane portion 211 is greater than the hardness of the enclosing portion 212, the plane portion 211 can be presented as stiffness and flat, and the enclosing portion 212 can be flexible so as to extend the product life of the flexible waterproof pad 210.

Also, the enclosing portion 212 and the plane portion 211 are not coplanar, for example, the plane portion 211 is farther away from the elastic frame 700 than the enclosing portion 212, such that the coupling strength of the plane portion 211 can be increased. However, the disclosure is not limited thereto, in another embodiment, the enclosing portion 212 also can be farther away from the elastic frame 700 than the plane portion 211.

Furthermore, the enclosing portion 212 includes a connection portion 213 and an elastic bending portion 214. The connection portion 213 is connected to the chassis 130, and two opposite ends of the elastic bending portion 214 are respectively connected to the connection portion 213 and the plane portion 211 hermetically. The elastic bending portion 214 includes a depression depth G, and the depression depth G is a pressing stroke that the flexible waterproof pad 210 is tolerable to be pressed at least.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A waterproof notebook computer, comprising:
    a chassis having a receiving space;
    a flexible waterproof pad exposed from one surface of the chassis, all edges of the flexible waterproof pad being connected to the chassis hermetically so that the receiving space of the chassis is isolated from the exterior of the chassis;
    a trigger switch disposed inside the receiving space;
    an elastic frame disposed inside the receiving space in which one end of the elastic frame is connected to the chassis, and the other end of the elastic frame is a free end; and
    a touchpad disposed between the trigger switch and the flexible waterproof pad, and between the flexible waterproof pad and the elastic frame, the flexible waterproof pad being sandwiched between the chassis and the elastic frame,
    wherein, when the touchpad is pressed towards the receiving space through the flexible waterproof pad, the flexible waterproof pad stretches to enable the touchpad to trigger the trigger switch.

2. The waterproof notebook computer of claim 1, further comprising a fixing frame that is fixed inside the receiving space for triggering the trigger switch, and wherein the touchpad is provided with a touch control surface, the touch control surface is in contact with the flexible waterproof pad, and the trigger switch is disposed on one surface of the touchpad opposite to the touch control surface, and unveiled at the free end of the elastic frame.

3. The waterproof notebook computer of claim 2, wherein the fixing frame is provided with a bump thereon, which the bump is aligned with the trigger switch for triggering the trigger switch.

4. The waterproof notebook computer of claim 2, wherein the chassis is provided with an opening that is in communication with the receiving space, and the flexible waterproof pad covers the opening hermetically.

5. The waterproof notebook computer of claim 2, further comprising:
    an adhesive layer adhered the flexible waterproof pad and the chassis so that the flexible waterproof pad is able to cover the opening hermetically.

6. The waterproof notebook computer of claim 2, wherein the all edges of the flexible waterproof pad are seamlessly connected to the chassis.

7. The waterproof notebook computer of claim 1, wherein the flexible waterproof pad comprises a plane portion and an enclosing portion that surrounds the plane portion, and the enclosing portion is not coplanar to the plane portion, and the enclosing portion is connected to the plane portion and the chassis hermetically.

8. The waterproof notebook computer of claim 7, wherein the enclosing portion comprises a connection portion and an elastic bending portion that is connected to the chassis, and the elastic bending portion is connected to the connection portion and the plane portion hermetically.

9. The waterproof notebook computer of claim 7, wherein a hardness of the plane portion is different to a hardness of the enclosing portion.

10. The waterproof notebook computer of claim 7, wherein a material of at least one of the plane portion and the enclosing portion is metal, plastic or rubber.

* * * * *